(12) United States Patent
Kaplan

(10) Patent No.: US 7,964,804 B2
(45) Date of Patent: Jun. 21, 2011

(54) EXTERIOR RACEWAY SYSTEM FOR CABLES

(75) Inventor: Steven E. Kaplan, Elyria, OH (US)

(73) Assignee: Multilink, Inc., Elyria, OH (US)

( * ) Notice: Subject to any disclaimer, the term of this patent is extended or adjusted under 35 U.S.C. 154(b) by 219 days.

(21) Appl. No.: 12/334,782

(22) Filed: Dec. 15, 2008

(65) Prior Publication Data

US 2010/0147579 A1   Jun. 17, 2010

(51) Int. Cl.
*H02G 3/08* (2006.01)
(52) U.S. Cl. ...... 174/481; 174/480; 174/68.1; 174/72 A; 174/97; 174/101; 52/220.1
(58) Field of Classification Search ............... 174/480, 174/481, 68.1, 68.3, 72 A, 97, 101; 52/220.1, 52/220.5
See application file for complete search history.

(56) References Cited

U.S. PATENT DOCUMENTS

| | | | |
|---|---|---|---|
| 1,844,269 A | 2/1932 | Binkley | |
| 4,951,716 A | 8/1990 | Tsunoda et al. | |
| 5,929,380 A | 7/1999 | Carlson, Jr. et al. | |
| 6,037,543 A * | 3/2000 | Nicoli et al. | 174/72 R |
| 6,972,367 B2 * | 12/2005 | Federspiel et al. | 174/481 |
| 2007/0256851 A1 * | 11/2007 | Kennedy et al. | 174/68.3 |

* cited by examiner

*Primary Examiner* — Dhiru R Patel
(74) *Attorney, Agent, or Firm* — Renner, Otto, Boisselle & Sklar, LLP

(57) ABSTRACT

Exterior raceway system includes one or more elongated base members and associated cover members for concealing and protecting one or more cables against the weather when mounted on an exterior wall structure of a building. The cover members are removably attachable to the base members to facilitate mounting of the base members to the exterior wall structure and the attachment of one or more cables to the base member prior to attaching the cover members to the respective base members.

16 Claims, 6 Drawing Sheets

EXTERIOR RACEWAY SYSTEM FOR CABLES

FIELD OF THE INVENTION

This invention relates generally to an exterior raceway system for installation on an exterior wall structure of a building for concealing and protecting against the weather different types of cables for various applications including, for example, telecommunications, cable television, satellite, heating, ventilation and air conditioning, solar, fiber and/or coaxial/twisted pair applications.

BACKGROUND OF THE INVENTION

It is generally known to use downspouts to conceal and protect cable against the weather on an exterior wall structure of a building. However, that makes it difficult to place the cables inside the downspouts and mount the downspouts to an exterior wall structure.

SUMMARY OF THE INVENTION

The present invention relates to an exterior raceway system that includes one or more elongated base members, and associated cover members that are removably attachable to the base members to facilitate mounting of the base members to an exterior wall structure of a building and the placement of cables inside the raceway system.

In accordance with one aspect of the invention, the cover members may be attached to the base members after the base members have been fixedly attached to the exterior wall structure and the cables have been placed along the base members.

In accordance with another aspect of the invention, the cover members may be hingedly connected to the base members.

In accordance with another aspect of the invention, the cover members may be snap fitted onto the base members.

In accordance with another aspect of the invention, bridge lances may be provided at spaced intervals along the length of the base members for insertion of ties through the bridge lances for tying one or more cables to the base members.

In accordance with another aspect of the invention, seam covers may be provided for covering gaps or seams between adjacent cover members.

In accordance with another aspect of the invention, two-piece angled and/or tee fittings may be fitted around respective ends of base members and associated cover members for routing cables in different directions as needed.

In accordance with another aspect of the invention, two-piece right angle corner fittings may be fitted around respective ends of two base members and associated cover members for maintaining a minimum bend radius in cables routed around a right angle outside corner of an exterior wall structure.

In accordance with another aspect of the invention, end cap fittings may be provided for closing off an open end of the raceway system as needed.

In accordance with another aspect of the invention, stepped adaptors may be provided for connecting an open end of the raceway system to different sized square or round tubing as needed.

In accordance with another aspect of the invention, end mounting adaptors may be provided for connecting an end of the raceway system to a right angle wall structure.

These and other objects, advantages, features and aspects of the present invention will become apparent as the following description proceeds.

To the accomplishment of the foregoing and related ends, the invention, then, comprises the features hereinafter more fully described and particularly pointed out in the claims, the following description and the annexed drawings setting forth in detail certain illustrative embodiments of the invention, these being indicative, however, of but several of the various ways in which the principles of the invention may be employed.

DETAILED DESCRIPTION OF THE INVENTION

Figure 1:
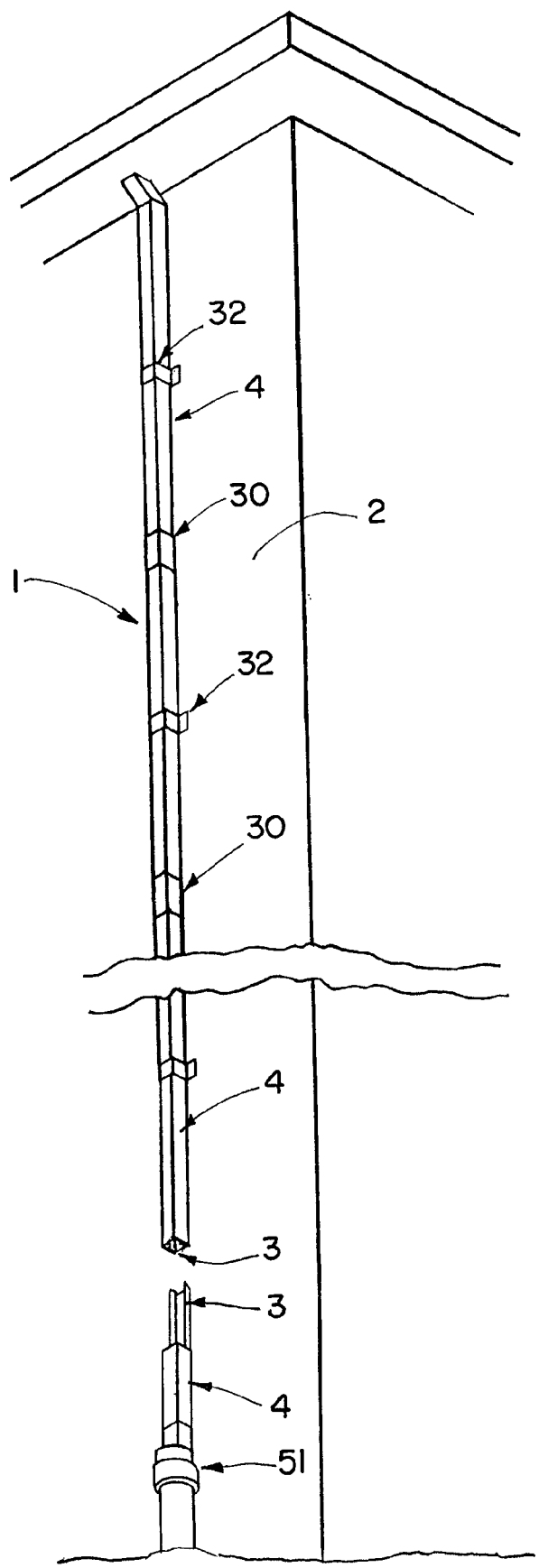
FIG. 1 is a schematic perspective view of one form of exterior raceway system of the present invention shown mounted on an exterior wall structure of a building for concealing and protecting one or more cables against the weather.

Referring now more particularly to the drawings, wherein the same reference numerals followed by a prime symbol (') are used to designate like parts, and initially FIG. 1, there is shown one form of exterior raceway system 1 of the present invention mounted on an exterior wall structure 2 of a building for concealing and protecting one or more cables against the weather. These cables may be used for different applications including, for example, telecommunications, cable television, satellite, heating, ventilation and air conditioning, solar, fiber and coaxial/twisted pair applications and the like. The raceway system includes one or more elongated base members 3 and associated cover members 4 which are selectively attachable/connectable to the base members for ease of mounting of the base members to the exterior wall structure and placement of one or more cables inside the raceway system as described hereafter.

The number of elongated base members and associated cover members used in a given raceway system installation will vary depending on the overall length of the raceway system and the length of the individual base members and associated cover members which are desirably provided in convenient lengths, for example, eight foot lengths, for ease of transportation, storage and installation. Both the base members and cover members may be made of a suitable plastic material and may be provided in different colors, for example, white, brown and beige. Also the base members and cover members may be cut to provide shorter lengths as needed.

Figure 4:
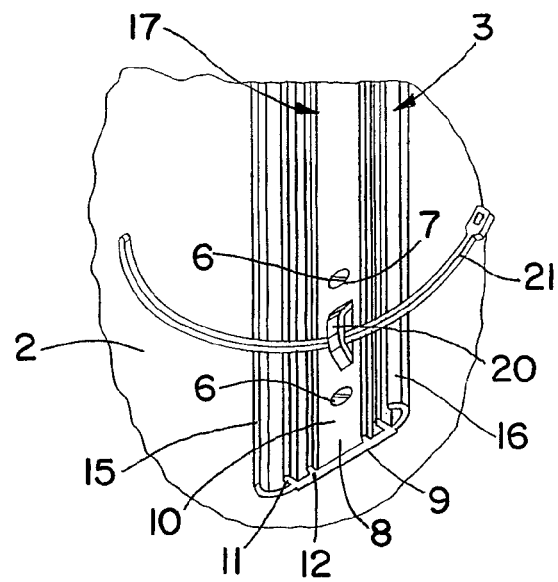
FIG. 4 is a perspective view of the base member portion of FIG. 3 showing one of a plurality of bridge lances in the base member used to secure cable ties thereto.

During installation, the individual base members and associated cover members are trimmed as needed, and the base members are attached to the exterior wall structure in the desired relation to one another prior to attaching the associated cover members to the base members. This allows for easy insertion of suitable fasteners 6 through spaced apart holes 7 in the back wall 8 of the base members and driving of the fasteners into the exterior wall structure 2 as shown in FIG. 4.

Figure 3:
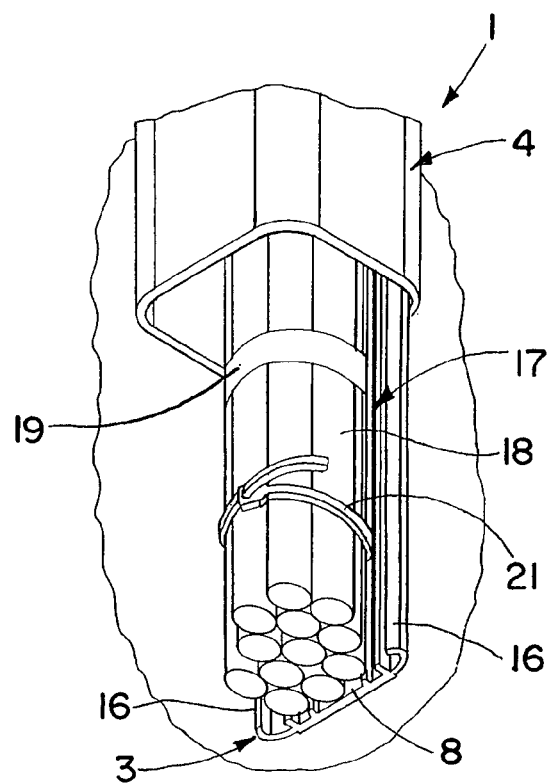
FIG. 3 is a still further enlarged perspective view of a section of the exterior raceway system of FIG. 2 with portions of the cover member removed to show a plurality of cables attached to the base member of the exterior raceway system.

The back side 9 of the back wall 8 of the base members 3 is desirably flat for substantial flat engagement with the exterior wall structure, whereas the front side 10 of the back wall may have a plurality of laterally spaced, longitudinally extending ribs 11, 12 for added strength and rigidity. Along opposite side edges of the base member back wall 8 are outturned flanges 15, 16 for providing a generally U-shaped channel 17 for receiving one or more cables 18 within the channel after the base members have been attached to the wall structure (see FIG. 3). If more than one cable 18 is provided, the cables may be loosely secured together as by tape 19 or the like prior to placement of the cables along the channels of the base members as shown in FIG. 3. Outwardly protruding bridge lances 20 may be provided at spaced intervals along the length of the base members 3 for insertion of ties 21 therethrough for use in tying the cables to the base members 3 as shown in FIGS. 3 and 4.

Figure 5:
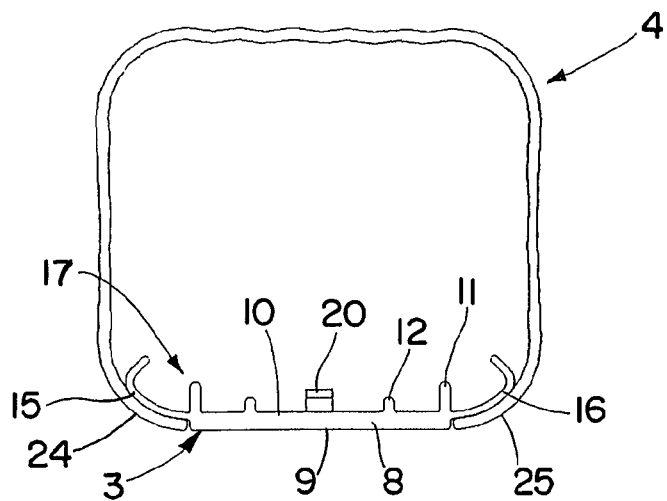
FIG. 5 is a further enlarged transverse section through one form of base member and associated cover member of the present invention which have a snap fit connection therebetween.

After the desired number of the base members 3 have been attached to the exterior wall structure and the cables 18 have been suitably secured to the base members, the cover members 4 may be attached to the respective base members as by providing flexible inturned flanges 24, 25 along opposite side edges of the cover members to provide a snap fit between the inturned flanges of the cover members and the outturned flanges 15, 16 of the base members. Preferably the outturned flanges 15, 16 of the base members are stepped outwardly from opposite side edges of the back wall 8 of the base members a distance sufficient to accommodate the inturned flanges of the cover members beneath the outturned flanges (see FIG. 5) when the base members are securely attached to the exterior wall structure.

Figure 6:
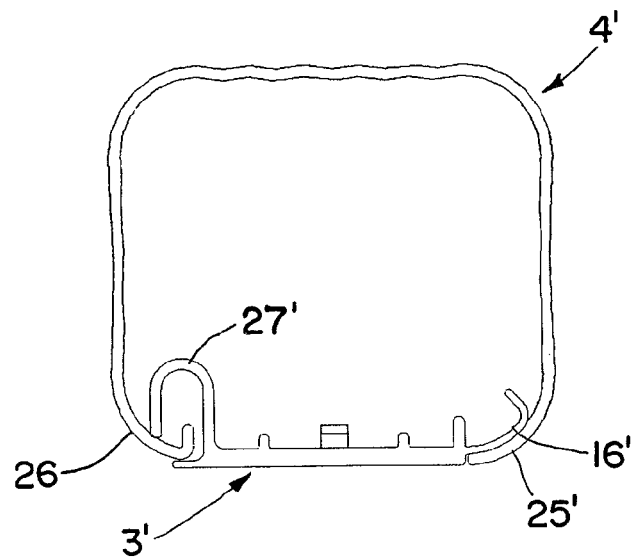
FIGS. 6 and 7 are further enlarged transverse sections through another form of base member and associated cover member of the present invention which are hingedly connected together.
Figure 7:
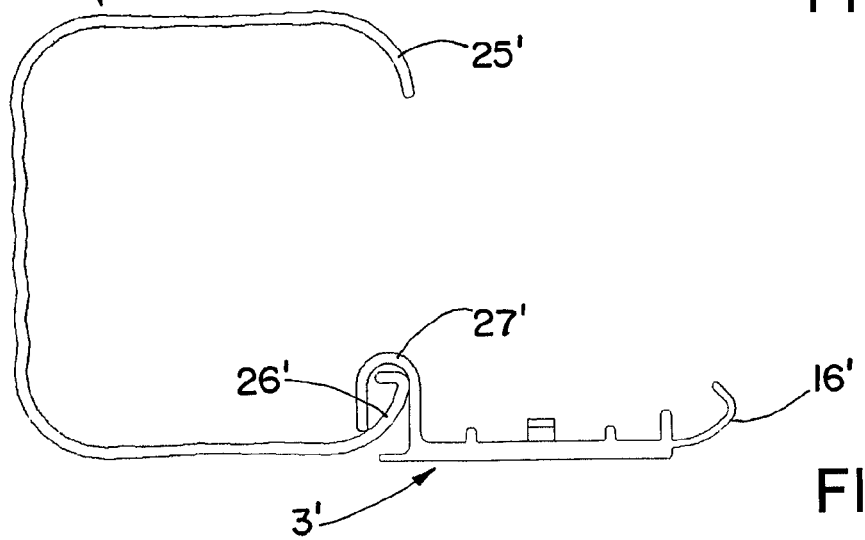

Alternatively, one of the inturned flanges 26' of the cover members 4' may be hingedly connected to one of the outturned flanges 27' of the base members 3' as shown in FIG. 7 prior to snap fitting the other inturned flange 25' of the cover members over the outturned flange 16' of the base members as shown in FIG. 6.

Figure 2:
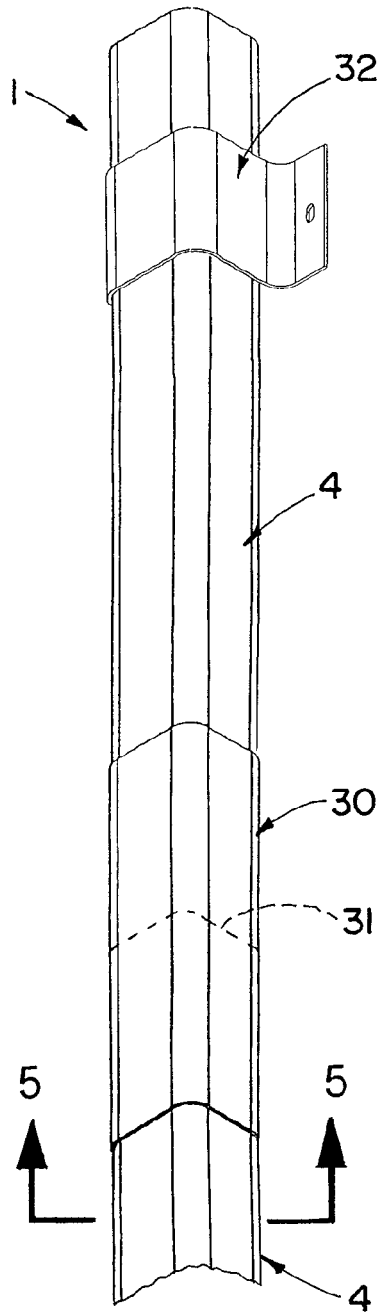
FIG. 2 is an enlarged perspective view of a section of the exterior raceway system of FIG. 1.
Figure 17:
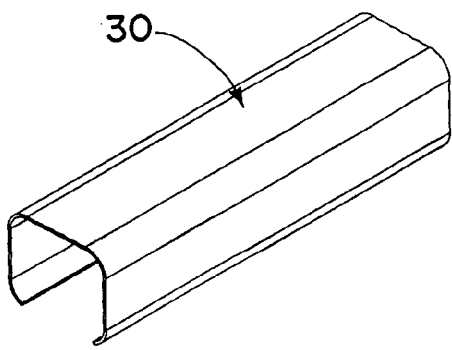
FIG. 17 is an enlarged perspective view of a seam cover system used to cover gaps or seams between adjacent cover members.

After the respective cover members 4, 4' are suitably attached to the respective base members 3, 3', seam covers 30 may be snap fitted over the ends of adjacent cover members for covering any gaps or seams 31 therebetween as schematically shown in FIG. 2. One of the seam covers 30 is shown in FIG. 17, which has substantially the same cross sectional shape as the cover members but is slightly larger to closely fit over the cover members. Also the seam covers 30 are substantially shorter than the cover members, for example, twelve inches in length. Suitable wall straps 32 may also be strategically placed over selected cover members and secured to the exterior wall structure for further securing the raceway system to the exterior wall structure as schematically shown in FIGS. 1 and 2.

Figure 8:
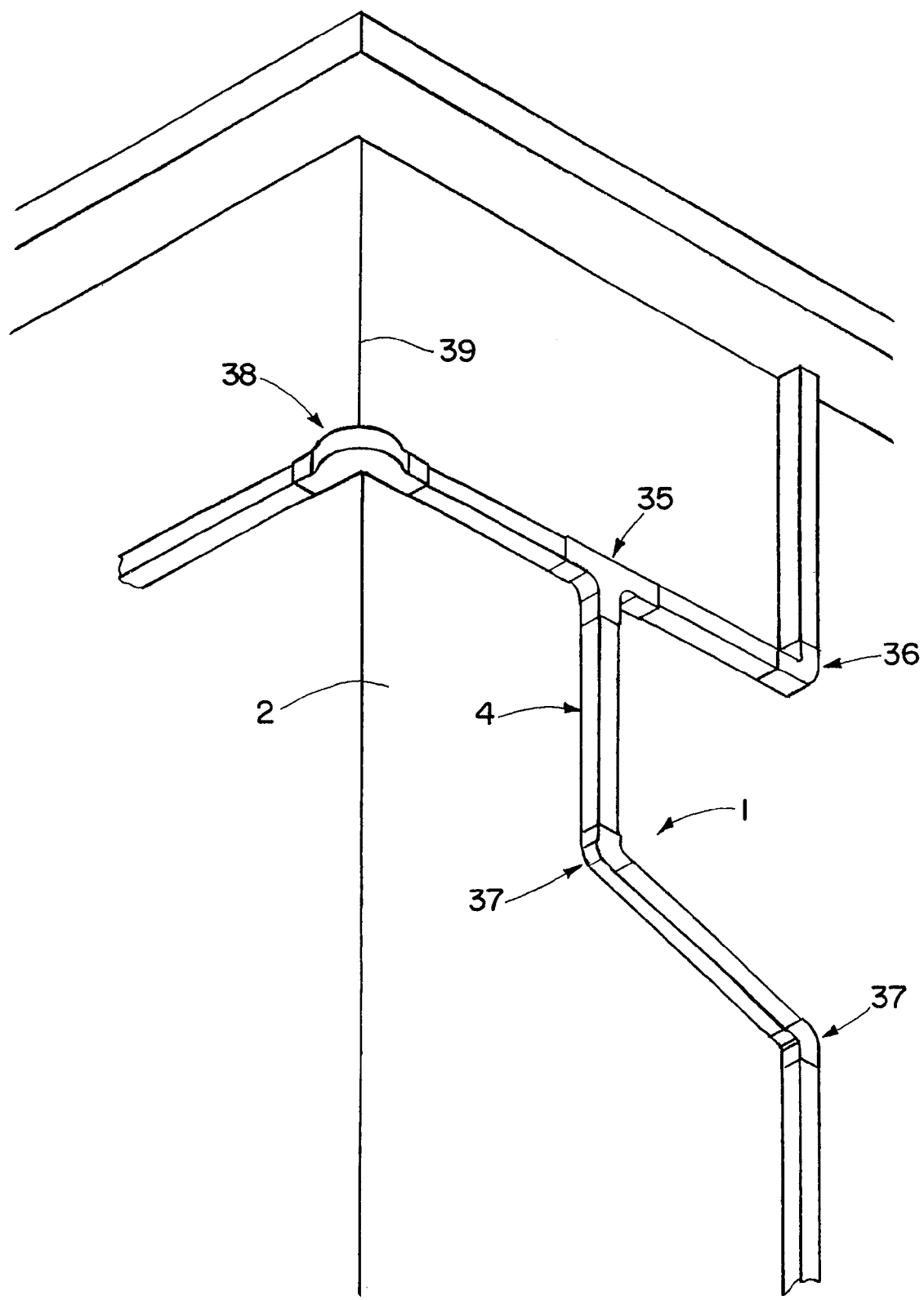
FIG. 8 is a schematic perspective view of a raceway system of the present invention shown mounted on an exterior wall structure of a building similar to FIG. 1 but including different fittings for routing cable in different directions.

If one or more of the cables 18 are required to be routed in different directions within the exterior raceway system, appropriate gaps may be provided between adjacent ends of respective base members and associated cover members to accommodate tee fittings or angled fittings between such ends as needed. For example, FIG. 8 shows a tee fitting 35 for receipt of adjacent ends of three base members 3 and associated cover members 4 for routing cable in three different directions. Also FIG. 8 shows a 90° angled fitting 36 and two 45° angled fittings 37 for receipt of adjacent ends of two base members 3 and associated cover members 4 for routing cable in different directions and a right angle corner fitting 38 for receipt of respective ends of two base members and associated cover members for routing cable around a right angle outside corner 39 of the exterior wall structure 2. In each case, the fittings are desirably comprised of two halves. One of the fitting halves is insertable underneath the spaced ends of respective base members during their attachment to the exterior wall structure, whereas the other fitting half is connectable to the one fitting half around the spaced ends of the respective base members and associated cover members after the cables have been attached to the base members and the cover members have been attached to the respective base members in the manner previously described.

Figure 9:
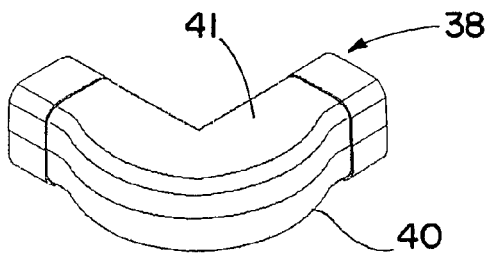
FIG. 9 is an enlarged perspective view of a right angle corner fitting for maintaining a minimum bend radius of cable when routed around a right angle outside corner of an exterior wall structure.
Figure 10:
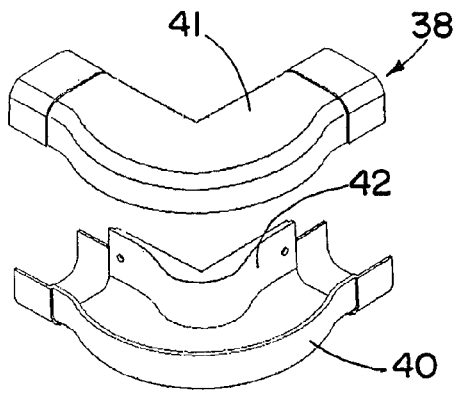
FIG. 10 is an exploded perspective view of the right angle corner fitting of FIG. 9.
Figure 11:
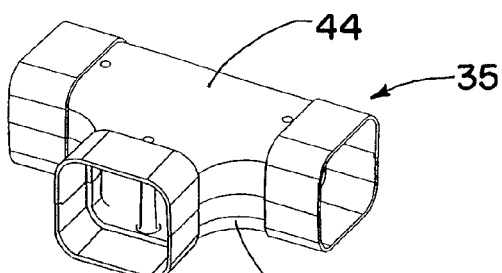
FIG. 11 is an enlarged perspective view of a tee fitting for routing cable in three different directions.
Figure 12:
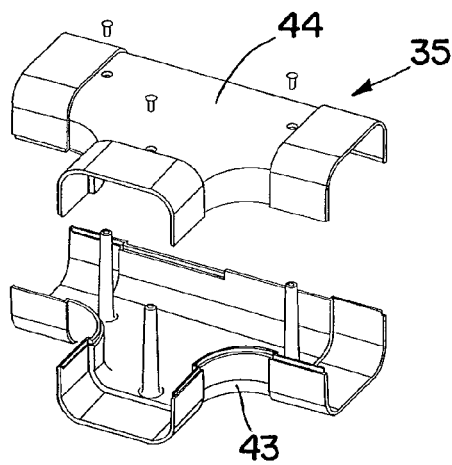
FIG. 12 is an exploded perspective view of the tee fitting of FIG. 11.
Figure 13:
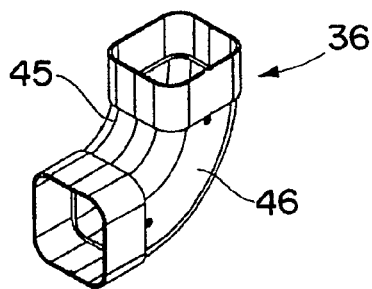
FIG. 13 is an enlarged perspective view of a 90° fitting for routing cable in different directions.
Figure 15:
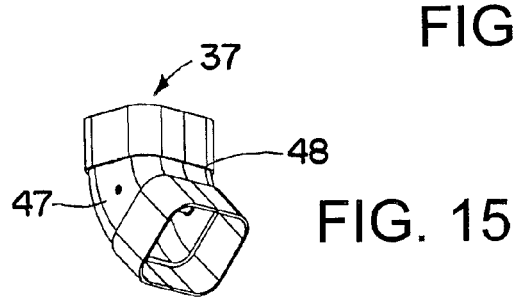
FIG. 15 is an enlarged perspective view of a 45° fitting for routing cable in different directions.
Figure 14:
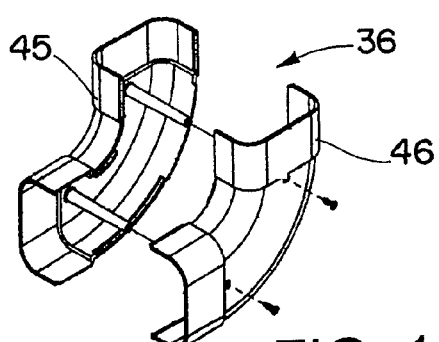
FIG. 14 is an exploded perspective view of the 90° fitting of FIG. 13.
Figure 16:
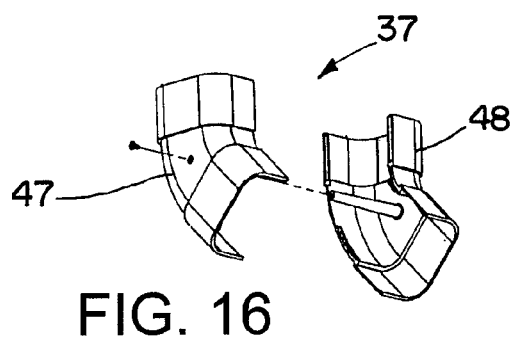
FIG. 16 is an exploded perspective view of the 45° fitting of FIG. 15.

FIGS. 9 and 10 show the two halves 40, 41 of a right angle corner fitting 38, the inner half 40 of which includes an interior convex rounded corner 42 for maintaining a minimum bend radius in the cable when wrapped around the right angle outside corner of the exterior wall structure. FIGS. 11 and 12 show the two halves 43 and 44 of a tee fitting 35, FIGS. 13 and 14 show the two halves 45 and 46 of a 90° fitting 36, and FIGS. 15 and 16 show the two halves 47 and 48 of a 45° fitting 37.

Figure 18:
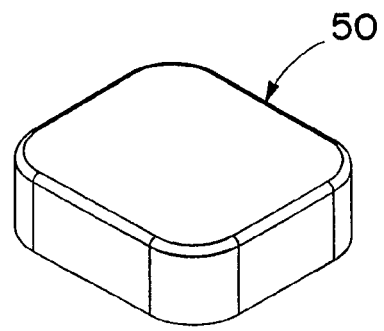
FIG. 18 is an enlarged perspective view of an end cap fitting for closing off an end of the raceway system.
Figure 19:
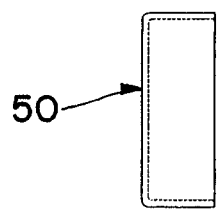
FIG. 19 is a transverse section through the end cap fitting of FIG. 18.
Figure 20:
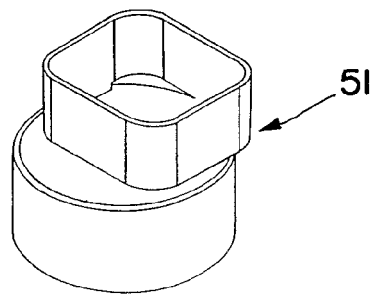
FIG. 20 is an enlarged perspective view of a stepped adaptor for connecting an end of the raceway system to round tubing.
Figure 21:
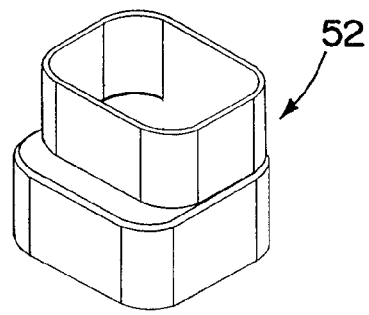
FIG. 21 is an enlarged perspective view of a stepped adaptor for connecting an end of the raceway system to square tubing.
Figure 22:
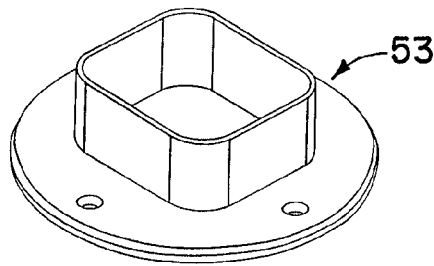
FIG. 22 is an enlarged perspective view of an end mounting adaptor for connecting an end of the raceway system to a right angle wall structure.

If needed, an end cap fitting 50, shown in FIGS. 18 and 19, may be provided for receipt of an end of one of the base members and associated cover member for closing off an end of the raceway system. Also a stepped adaptor may be provided for receipt of an end of one of the base members and associated cover member for connecting the raceway system to larger square or round tubing. FIG. 20 shows one such adaptor 51 for connecting the raceway system to a larger round tubing, whereas FIG. 21 shows another such adaptor 52 for connecting the raceway system to a larger square tubing. FIG. 22 shows an end mounting adaptor 53 which may be used to attach an end of the raceway system to a right angle wall structure.

Although the invention has been shown and described with respect to certain embodiments, it is obvious that equivalent alterations and modifications will occur to others skilled in the art upon the reading and understanding of the specification. In particular, with regard to the various functions performed by the above-described components, the terms (including any reference to a "means") used to describe such components are intended to correspond, unless otherwise indicated, to any component which performs the specified function of the described component (e.g., that is functionally equivalent), even though not structurally equivalent to the disclosed component which performs the function of the herein illustrated exemplary embodiments of the invention. In addition, while a particular feature of the invention may have been disclosed with respect to only one embodiment, such feature may be combined with one or more other features as may be desired and advantageous for any given or particular application.

What is claimed is:

1. An exterior raceway system for attachment to an exterior wall structure of a building for concealing and protecting one or more cables against the weather, the system comprising at least one elongated base member having a back wall that is attachable to an exterior wall structure of a building, outturned flanges along opposite side edges of the back wall, and an elongated cover member that is selectively attachable to the base member, wherein the cover member is generally U-shaped and has inturned flanges along opposite side edges of the cover member sized for placement over and completely around the outturned flanges of the base member, and wherein the inturned flanges of the cover member are flexible to provide a snap fit over and completely around the outturned flanges of the base member.

2. The system of claim 1 wherein one of the inturned flanges of the cover member is hingedly connectable to one of the outturned flanges of the base member.

3. The system of claim 1 wherein outwardly protruding bridge lances are provided at spaced intervals along the length of the back wall of the base member for insertion of ties through the bridge lances for tying one or more cables to the back wall.

4. The system of claim 1 which includes a plurality of elongated base members that are attachable to the exterior wall structure in end to end relation to one another, and a plurality of elongated cover members that are selectively attachable to respective base members.

5. The system of claim 4 further comprising seam covers for covering gaps or seams between adjacent cover members, the seam covers having substantially the same cross-sectional shape as the cover members but are sized to closely fit over end portions of adjacent cover members.

6. The system of claim 4 further comprising wall straps for further securing the cover members and associated base members to the exterior wall structure.

7. The system of claim 4 further comprising an angled fitting for receipt of spaced apart ends of two of the base members and associated cover members for routing cable in different directions.

8. The system of claim 7 wherein the angled fitting is comprised of two halves connectable together around the spaced apart ends of two of the base members and associated cover members.

9. The system of claim 4 further comprising a tee fitting for receipt of spaced apart ends of three of the base members and associated cover members for routing cable in different directions.

10. The system of claim 9 wherein the tee fitting is comprised of two halves that are connectable together around the spaced apart ends of three of the base members and associated cover members.

11. The system of claim 4 further comprising an end cap fitting for closing off an end of one of the base members and associated cover members.

12. The system of claim 4 further comprising a stepped adaptor for receipt of an end of one of the base members and associated cover member for connecting the raceway system to different sized square tubing.

13. The system of claim 4 further comprising a stepped adaptor for receipt of an end of one of the base members and associated cover member for connecting the raceway system to different sized round tubing.

14. The system of claim 4 further comprising an end mounting adaptor for receipt of an end of one of the base members and associated cover member.

15. The system of claim 4 further comprising a right angle corner fitting for receipt of spaced apart ends of two of the base members and associated cover members for maintaining a minimum bend radius in cable around a right angle outside corner of an exterior wall structure.

16. The system of claim 1 wherein the outturned flanges of the base member are stepped outwardly from opposite sides of the back wall of the base member a sufficient distance to accommodate the inturned flanges of the cover member beneath the outturned flanges when the base member is attached to an exterior wall structure.

* * * * *